(12) United States Patent
Zhong et al.

(10) Patent No.: US 10,516,685 B2
(45) Date of Patent: Dec. 24, 2019

(54) ANALYSIS METHOD, ANALYSIS DEVICE AND ANALYSIS PROGRAM

(71) Applicant: NIPPON TELEGRAPH AND TELEPHONE CORPORATION, Chiyoda-ku (JP)

(72) Inventors: Yang Zhong, Musashino (JP); Hiroshi Asakura, Musashino (JP); Masaki Tanikawa, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/579,463

(22) PCT Filed: Jul. 25, 2016

(86) PCT No.: PCT/JP2016/071720
§ 371 (c)(1),
(2) Date: Dec. 4, 2017

(87) PCT Pub. No.: WO2017/018377
PCT Pub. Date: Feb. 2, 2017

(65) Prior Publication Data
US 2018/0167406 A1 Jun. 14, 2018

(30) Foreign Application Priority Data
Jul. 30, 2015 (JP) .................................. 2015-151264

(51) Int. Cl.
*G06F 12/14* (2006.01)
*H04L 29/06* (2006.01)
(Continued)

(52) U.S. Cl.
CPC .......... *H04L 63/1425* (2013.01); *G06F 21/55* (2013.01); *H04L 43/04* (2013.01); *H04L 63/1416* (2013.01); *H04L 63/1441* (2013.01)

(58) Field of Classification Search
None
See application file for complete search history.

(56) References Cited

U.S. PATENT DOCUMENTS 8,516,575 B2 * 8/2013 Burnside ............. H04L 63/1425
715/733
2010/0223499 A1 * 9/2010 Panigrahy ........... G06F 11/0709
714/19
(Continued)

FOREIGN PATENT DOCUMENTS

EP  0 985 995 A1  3/2000
JP  2004-186878 A  7/2004
(Continued)

OTHER PUBLICATIONS

Florian Skopik, et al., "Intrusion Detection in Distributed Systems using Fingerprinting and Massive Event Correlation" [online], 2012, [retrieved Jul. 16, 2015], Internet URL:http://www.ait.ac.at/uploads/media/Skopik_Fiedler_2013_02.pdf, (15 pages).
(Continued)

*Primary Examiner* — Brandon S Hoffman
(74) *Attorney, Agent, or Firm* — Oblon, McClelland, Maier & Neustadt, L.L.P.

(57) ABSTRACT

In order to detect an attack to a web application accurately by accurately correlating different types of events having occurred in the same server, an event acquiring unit acquires a log of events containing a HTTP request to a server, an event correlator creates a set of the request and events relevant to the request as an event block by using process IDs of processes having processed events contained in the log, and an attack detector contrasts the event block that is
(Continued)

created from the log of events in which an attack is to be detected with an event block that is created from normal events to calculate a degree of similarity and, when the degree of similarity is equal to or lower than a threshold, detects the event block as an event block containing an event that is abnormal due to an attack.

5 Claims, 12 Drawing Sheets

(51) Int. Cl.
  *G06F 21/55* (2013.01)
  *H04L 12/26* (2006.01)

(56) References Cited

U.S. PATENT DOCUMENTS

| | | |
|---|---|---|
| 2014/0165140 A1 | 6/2014 | Singla et al. |
| 2015/0222514 A1 | 8/2015 | Masuda et al. |
| 2016/0197952 A1 | 7/2016 | Fujimoto et al. |

FOREIGN PATENT DOCUMENTS

| | | |
|---|---|---|
| JP | 2005-38116 A | 2/2005 |
| JP | 2012-94046 A | 5/2012 |
| JP | 2014-531647 A | 11/2014 |
| JP | 5640167 B1 | 12/2014 |
| WO | 2014/174681 A1 | 10/2014 |

OTHER PUBLICATIONS

International Search Report dated Aug. 23, 2016 in PCT/JP2016/071720 filed Jul. 25, 2016.
Japanese Office Action dated Nov. 6, 2018 in Patent Application No. 2017-530856 (with English translation), 5 pages.
Extended European Search Report dated Nov. 29, 2018 in Patent Application No. 16830482.2, citing document Ax therein, 8 pages.
Yang Zhong, "You Can Also Do! the More Nearly Full-Scale Analysis at Technical [Volume on Security] Chapter 4 Linux Audit Which Reads a Log" The Software Design, Jul. 2015 item, Japan, Technical Hyoronsha, Jul. 18, 2015, the 363rd Volume of the Set and Publication No. 297, pp. 44-52 and cover pages.
John P. Rouillard, "Real-time Log File Analysis Using the Simple Event Correlator (SEC)" USENIX, XP061012117, Sep. 8, 2004, pp. 133-149.

* cited by examiner

- HTTP REQUEST
  - 2015/1/1 00:00:00 1001 192.168.1.1 GET /index.php HTTP/1.1 – Mozila 5.0 (compitable; MSIE 8.0)...
- FILE ACCESS
  - type=SYSCALL, syscall=open pid=1001, a0= /var/lib/php/sess_1, a1=0644 ...
- NETWORK ACCESS
  - type=SYSCALL, syscall=connect pid=1001, from= 192.168.1.1:50001 to=192.168.1.1:3306
- COMMAND EXECUTION
  - type=SYSCALL, syscall=execve, pid=1001, a0=bin/sh
- DB ACCESS
  - 50001, username, dbname, SELECT * FROM user

⇩

- HTTP REQUEST
  - {type: http_req, method: GET, url: /index.php, pid: 1001 ...}
- FILE ACCESS
  - {type: file, path: /var/lib/php/sess_1, access:write, pid: 1001 ...}
- NETWORK ACCESS
  - {type: net, src_port:50001, dst_port:3306, pid: 1001 ...}
- COMMAND EXECUTION
  - {type: command, exec: /bin/sh, pid: 1001 ...}
- DB ACCESS
  - {type: db, src_port: 50001, query: SELECT * FROM user; ...}

{web1 : 1, file1 : 2, file2 : 2, command1 : 1, network1 : 2, ... }
{web1 : 1, file1 : 2, file2 : 1, command1 : 1, network2 : 1, ... }

ANALYSIS METHOD, ANALYSIS DEVICE AND ANALYSIS PROGRAM

FIELD

The present invention relates to an analysis method, an analysis device and an analysis program.

BACKGROUND

Recently, web applications are used in a lot of services and are becoming part of social infrastructure. At the same time, the number of attacks abusing the vulnerability of web applications is increasing. When such attacks cause defacing of the content or information leakage, serious damages occur to service providers and therefore it is necessary to detect the attacks.

A technology for correlating different types of events, such as an HTTP request event and another event occurring in the same web server, in order to detect an attack to a web application is known. For example, an HTTP request and a FireWall log are compared with each other and events occurring at times close to each other are correlated as events relevant to each other (see Non Patent Literature 1).

CITATION LIST

Non Patent Literature

Non Patent Literature 1: Florian Skopik, Roman Fielder, "Intrusion Detection in Distributed Systems using Fingerprinting and Massive Event Correlation" [online], 2012, [retrieved Jul. 16, 2015], Internet <URL:http://www.ait.ac.at/uploads/media/Skopik_Fielder_2013_02.pdf>

SUMMARY

Technical Problem

Correlating events with reference to only times of occurrence of events has a risk that a case where the correlating is not performed correctly occurs. For example, when events irrelevant to each other occur incidentally at times close to each other, the events may be correlated erroneously. On the other hand, a large difference between times of occurrence of events that are relevant to each other may hinder the events from being correlated although they are relevant to each other. As described above, there is a risk that, when events are not correlated accurately, attacks to the web application cannot be detected accurately.

The present invention was made in view of the above-described circumstances and an objective of the present invention is to detect an attack to a web application accurately by accurately correlating different types of events having occurred in the same server.

Solution to Problem

An analysis method including: an event acquiring step of acquiring a log of events containing a request to a server; an event block creating step of, by using process IDs of processes having processed events contained in the log, creating a set of the request and events relevant to the request as an event block; and an attack detecting step of contrasting the event block that is created from the log of events in which an attack is to be detected with an event block that is created from normal events to calculate a degree of similarity and, when the degree of similarity is equal to or lower than a threshold, detecting the event block as an event block containing an event that is abnormal due to an attack.

Advantageous Effects of Invention

According to the present invention, it is possible to accurately detect an attack to a web application by accurately correlating different types of events having occurred in the same server.

DESCRIPTION OF EMBODIMENTS

An embodiment of the present invention will be described in detail below with reference to the drawings. Note that the embodiment does not limit the invention. In the illustrations in the drawings, the same components are denoted with the same reference numbers.

System Configuration

Figure 1:
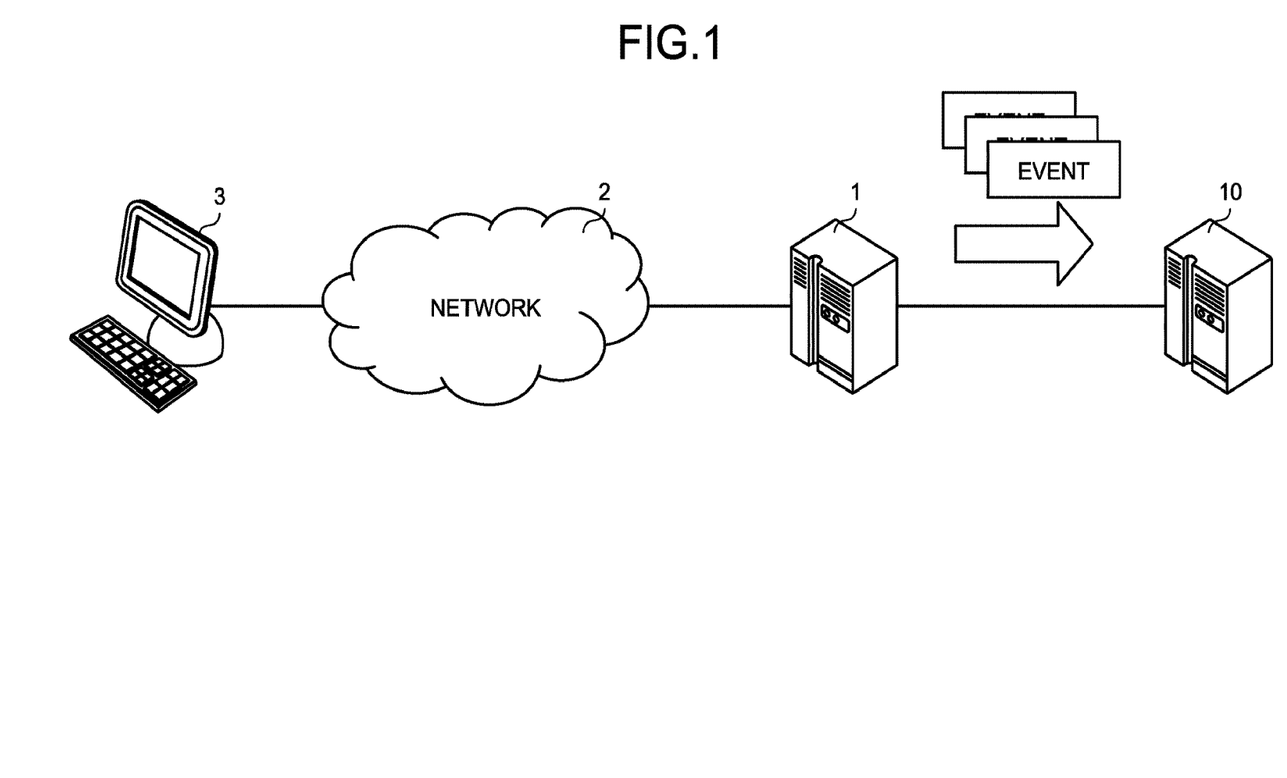
FIG. 1 is a schematic diagram illustrating a schematic configuration of a system to be analyzed by an analysis device according to an embodiment of the present invention.

FIG. 1 is a schematic diagram exemplifying a schematic configuration of a system to be analyzed by an analysis device according to the embodiment. As illustrated in FIG. 1, a web server 1 that is run by a service provider receives a request to the web server 1, such as an HTTP request, from a client terminal 3 via a network 2 and provides a web application service to the user of the client terminal 3. The web server 1 stores, in an appropriate storage area, a log of events, such as HTTP requests about provision of web application services, file accesses, network accesses, execution of commands, and database (DB) accesses.

In such a system, an analysis device 10 according to the embodiment 10 acquires the event log from the web server 1 and correlates different types of events occurring in the web server 1 by performing an analysis process, which will be described below. The analysis device 10 and the web server 1 may consist of the same hardware. In that case, the web server 1 performs the analysis process.

Configuration of Analysis Device

Figure 2:
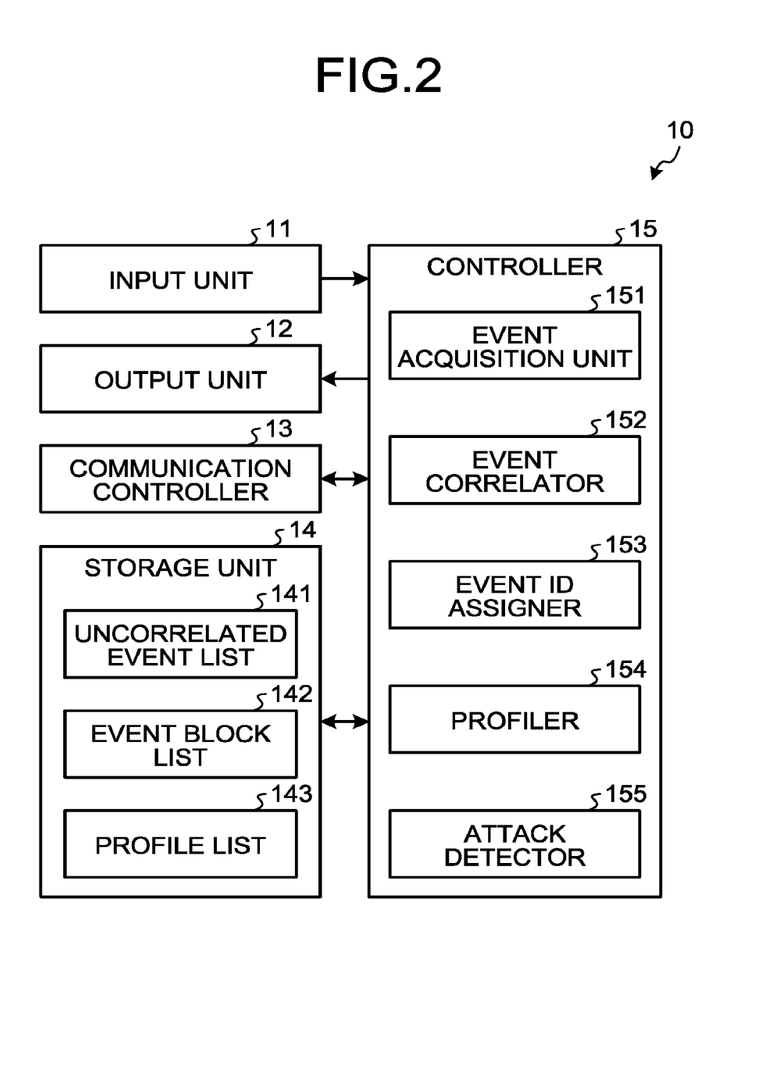
FIG. 2 is a schematic diagram illustrating a schematic configuration of the analysis device according to the embodiment.

FIG. 2 is a schematic diagram illustrating a schematic configuration of an analysis device according to the embodiment. The analysis device 10 is implemented with a general-purpose computer, such as a work station or a personal computer. The analysis device 10 includes an input unit 11, an output unit 12, a communication controller 13, a storage unit 14 and a controller 15.

The input unit 11 is implemented with an input device, such as a keyboard or a mouse. The input unit 11 inputs various types of instruction information, for example, to start a process to the controller 15 according to an input operation by a data analyzer. The output unit 12 is implemented with a display device, such as a liquid crystal display, a printing device, such as a printer, and an information communication device. The output unit 12 outputs the result of the analysis process, which will be described below, to the data analyzer. The communication controller 13 is implemented with, for example, a network interface card (NIC). The communication controller 13 controls communications between an external device, such as the web server 1, with the controller 15 via an electronic communication line, such as a local area network (LAN) or the Internet.

The storage unit 14 is implemented with a semiconductor memory device, such as a random access memory (RAM) or a flash memory, or a storage device, such as a hard disk or an optical disk. The storage unit 14 stores an uncorrelated event list 141, an event block list 142, and a profile list 143. Those types of information are, as described below, generated in the analysis process based on the event log acquired from the web server 1 via the communication controller 13 or the input unit 11. The storage unit 14 may be configured to communicate with the controller 15 via the communication controller 13.

A computing device, such as a central processing unit (CPU), executes a process program that is stored in a memory and accordingly, as exemplified in FIG. 2, the controller 15 functions as an event acquisition unit 151, an event correlator 152, an event ID assigner 153, a profiler 154, and an attack detector 155.

Figure 3:
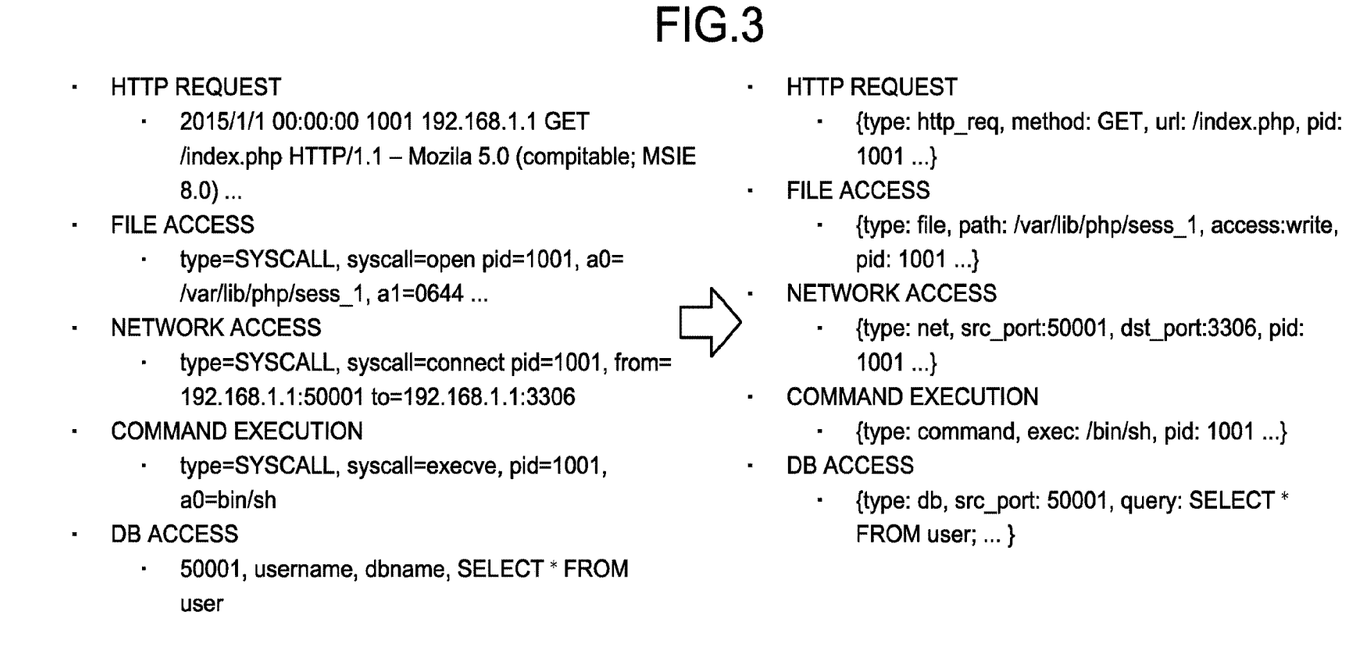
FIG. 3 is an explanatory view for explaining an event on which an analysis process is performed according to the embodiment.

The event acquisition unit 151 acquires a log of events containing a request to the server. Specifically, the event acquisition unit 151 acquires the log of events containing a HTTP request from the web server 1 and, as exemplified in FIG. 3, shapes the form in order to easily perform the analysis process to be described below. For example, the event acquisition unit 151 shapes the form of the HTTP request exemplified in the following Expression (1) as exemplified in the following Expression (2).

$$2015/1/1\ 00:00\ 1001\ 192.168.1.1\ GET/index.php$$
$$HTTP/1.1-Mozila5.0(compitable;MSIE8.0) \quad (1)$$

$$\{type:http\_req,method:GET,url:/index.php,pid:\ 1001\ldots\} \quad (2)$$

In the shaping, for example, the type of an event, such as an HTTP request, a file access, a network access, command execution, or a database (DB) access, is set for the item "type". Specifically, for example, "type:http_req" is set for an HTTP request, "type:file" is set for a file access, "type:net" is set for a network access, "type:command" is set for command execution, and "type:db" is set for a DB access.

The event correlator 152 performs, on events that are acquired by the event acquisition unit 151, an event block creating process of creating a set of an HTTP request and events relevant to the HTTP request as an event block by using process IDs of processes that process the events. Specifically, the event correlator 152 creates an event block from the shaped events as exemplified in FIG. 4 and stores the event block in the event block list 142 of the storage unit 14. The event correlator 152 further stores events that are not included in the event block in the uncorrelated event list 141 of the storage unit 14.

When performing the event block creating process, the event correlator 152 uses any one of the two methods that are a process ID method and a transmission source port number method according to the type of event as a method of checking whether there is relevancy between the events. In the process ID method, the process ID (hereinafter, which may be simply referred to as PID) of each event is used. On the other hand, in the transmission source port number method, the transmission source port number of each event (hereinafter, it may be referred to as SRC_PORT) is used.

In the process ID method, the event correlator 152 checks the correlation between the PID of an HTTP request and the PID of each event or the PID of a parent process (a parent process ID, which will be abbreviated as PPID) and then performs correlating. The process ID method is used for an HTTP request and an event containing a PID and/or a PPID, such as a file access, a network access or command execution.

Figure 5:
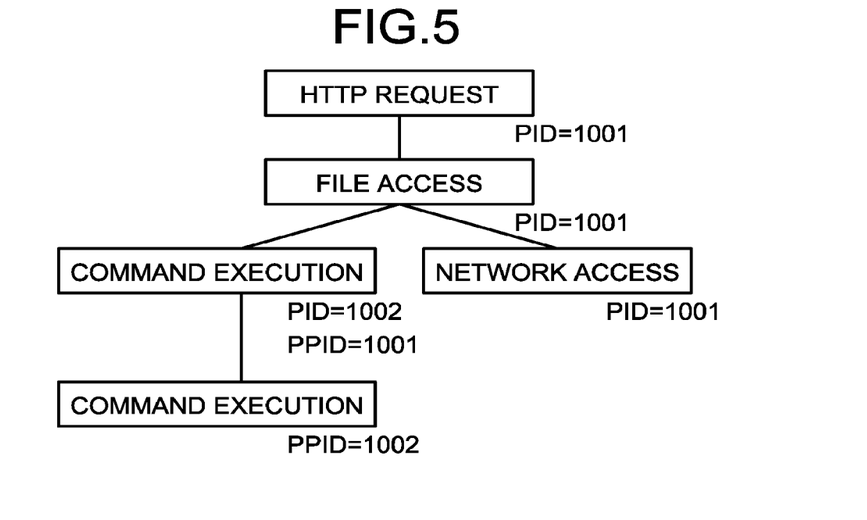
FIG. 5 is a schematic diagram exemplifying a process tree according to the embodiment.

Specifically, first of all, as illustrated in FIG. 5, the event correlator 152 calculates a process tree representing a parent-child relationship of events in which the process that processes the HTTP request serves as a parent process. The process tree is calculated by using a function of an OS, such as pstree of UNIX (trademark). The example in FIG. 5 illustrates that the PID of the HTTP request matches the PID or the PPID of each of a file access, command execution and a network access and thus a parent-child relationship is achieved. In other words, the PIDs of the HTTP request, the file access and the network access match (PID=1001). As the PPID (=1001) of the command execution following the file access matches the PID of the file access, a parent-child relationship is confirmed. As the PID (=1002) of the command execution and the PPID (=1002) of the following command execution match, a parent-child relationship is confirmed.

The event correlator 152 correlates, among events containing PIDs forming a required process tree, events each occurring at a time having a difference equal to or smaller than a given time Δ from the time of occurrence of the HTTP request serving as the parent process as events relevant to the HTTP request.

The given time Δ means the shortest time taken by the OS of the web server 1 to reuse the same PID for a different process. Normally, the web server 1 operates in a mode referred to as Prefork to prevent memory leakage. In the Prefork mode, a process is assigned to each HTTP request and HTTP requests are not processed simultaneously in a single process. Accordingly, it is possible to identify each of the HTTP requests according to the PIDs within the given time Δ.

In the transmission source port number method, the event correlator 152 correlates an event whose contained transmission source port number matches the event correlated with the HTTP request by the process ID method with the HTTP request. The transmission port number method is used for an event containing a transmission source port number, such as, a network access or a DB access.

Specifically, the event correlator 152 checks the times of occurrence of the DB access whose contained transmission source port number matches that of the network access that is correlated to the HTTP request by the process ID request and. When the difference in the time of occurrence from the HTTP request is equal to or smaller than Δ, the event correlator 152 correlates the DB access as an event relevant to the HTTP request and the network access.

Normally, the PID of a HTTP request is not assigned to a DB access that is an access to the DB outside the web server 1 by TCP communication. By checking the transmission source port number used in TCP communication between the web server and the DB, it is possible to check a response to the DB query and specify the DB access relevant to the HTTP request. Thus, as exemplified in FIG. 6, the DB access is correlated with the HTTP request and the network access by the transmission source port number method.

Figure 6:
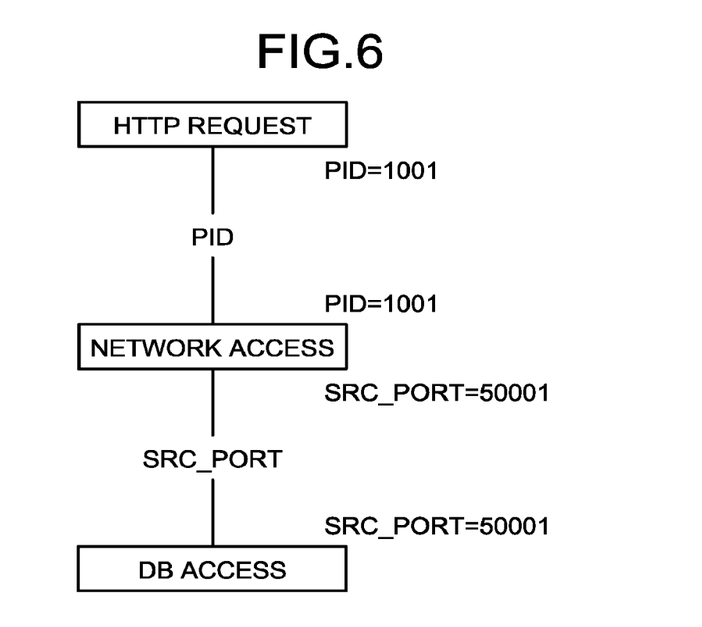
FIG. 6 is an explanatory view for explaining a transmission source port numbering method according to the embodiment.

In the example illustrated in FIG. 6, as the PID of the HTTP request and the PID of the network access match (PID=1001), the HTTP request and the network access are correlated by the process ID method. Furthermore, as the transmission port number of the network access and the transmission port number of the DB access match in transmission source port number (SRC_PORT=50001), the network access and the DB access are correlated by the transmission port number method.

Figure 4:
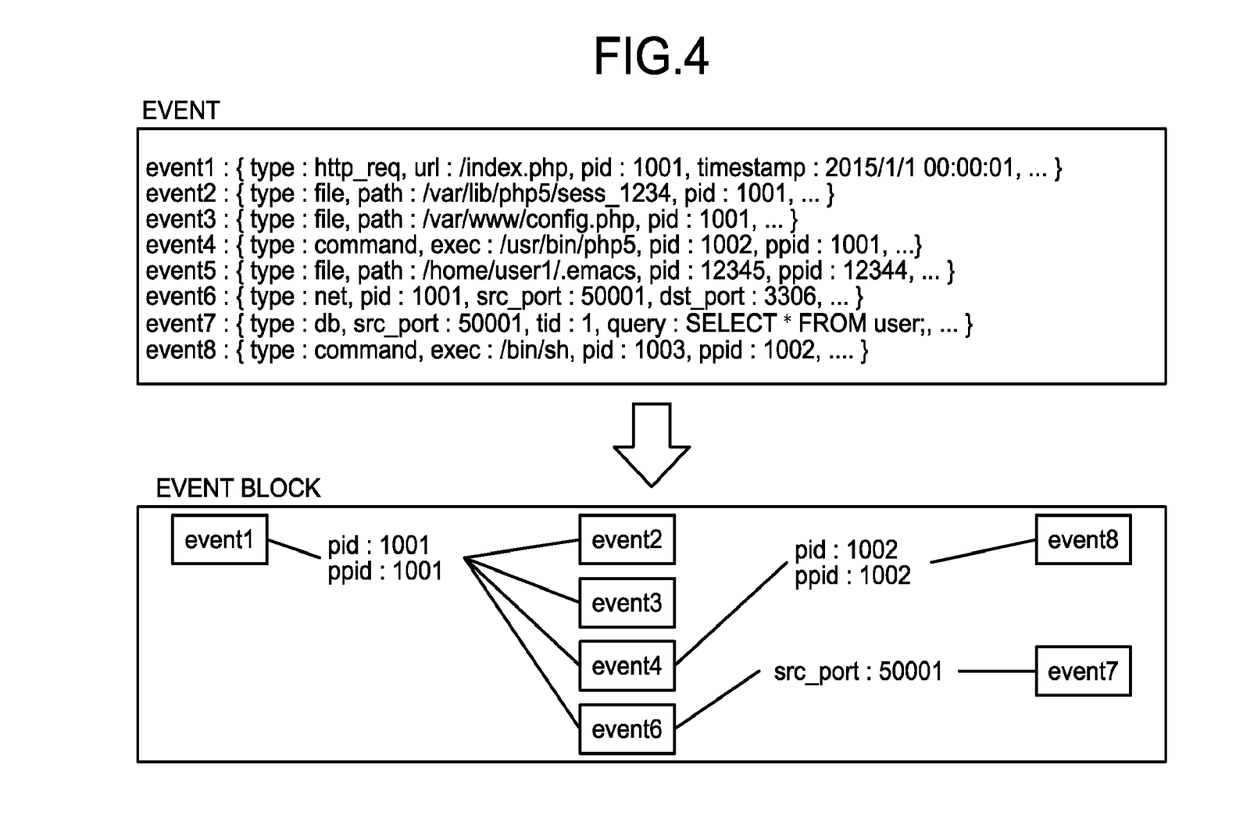
FIG. 4 is an explanatory view for explaining an event block according to the embodiment.

Similarly, in the example illustrated in FIG. 4, as the PID of event 1 matches the PIDs of event 2, event 3 and event 6 match (pid:1001), event 2, event 3 and event 6 are correlated to event 1 by the process ID method. As the PPID (:1001) of event 4 matches the PPID (:1001) of event 1, that is, as event 1 serves as a parent process of event 4, event 1 and event 4 are correlated by the process ID method. As the PPID (:1002) of event 8 matches the PPID (:1002) of event 4, that is, as event 4 serves as a parent process of event 8, event 4 and event 8 are correlated by the process ID method. Furthermore, as the transmission source port numbers (src_port:50001) of event 6 and event 7 match, event 6 and event 7 are correlated by the transmission source port number method.

The event ID assigner 153 assigns event IDs that make it possible to identify the events in the event block. For example, as exemplified in FIG. 7, event IDs that make it possible to identify each event together with the event type, such as web1, file2, network1, command1 and db1, are assigned. In the example illustrated in FIG. 7, an HTTP request is represented by "web", a file access is represented by "file", a network access is represented by "network", command execution is represented by "command", and a DB access is represented by "db".

Figure 7:
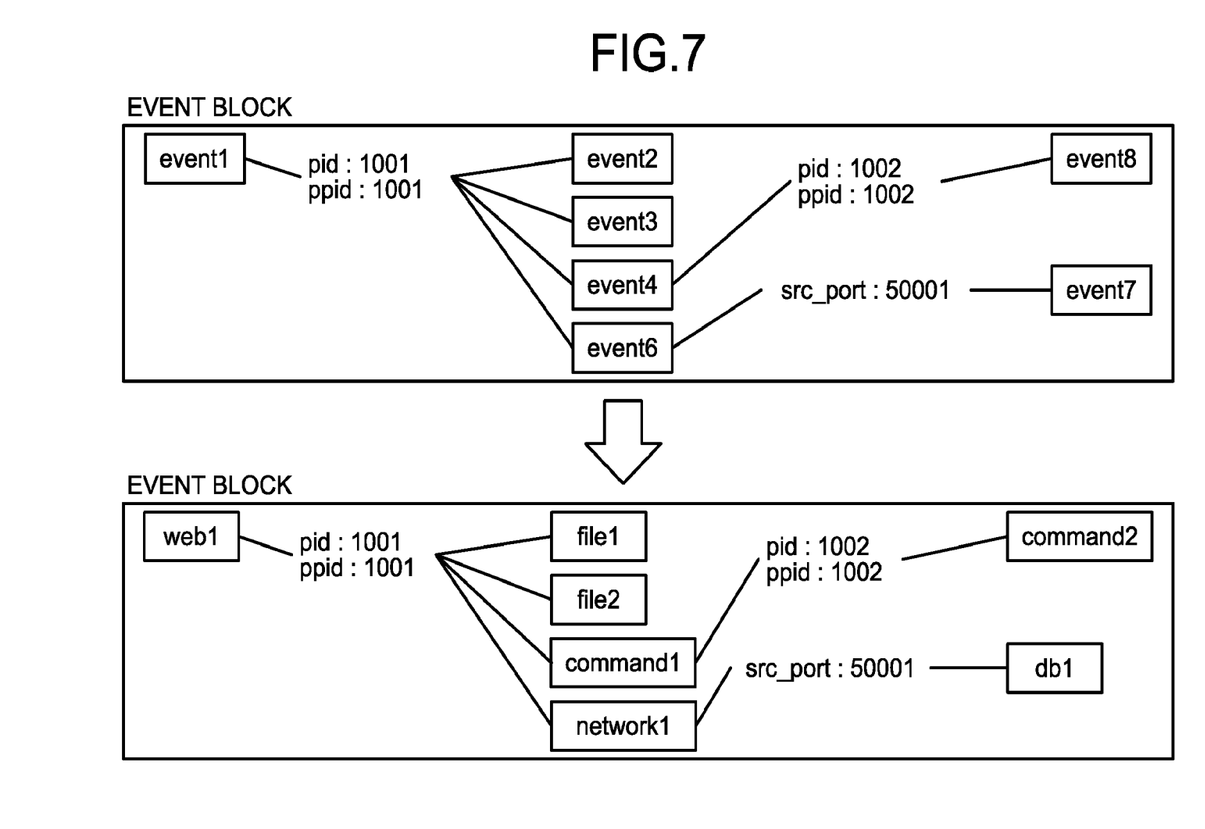
FIG. 7 is an explanatory view for explaining assignment of IDs to an event block according to the embodiment.

The profiler 154 creates a profile by abstracting the event block. Specifically, the profiler 154 creates, as a profile, a pattern enabling identification of the event IDs of the correlated events and the order of the correlated events from an event block of the event block list 142. For example, the profile exemplified by Expression (3) is created from the event block illustrated in FIG. 7. Expression (3) indicates the number of times each event has occurred. For example, web1:1 indicates that the event of web1 has occurred once.

$$\{web1:1, file1:1, file2:1, command1:1, network1: 1, \ldots\} \quad (3)$$

Figure 8:
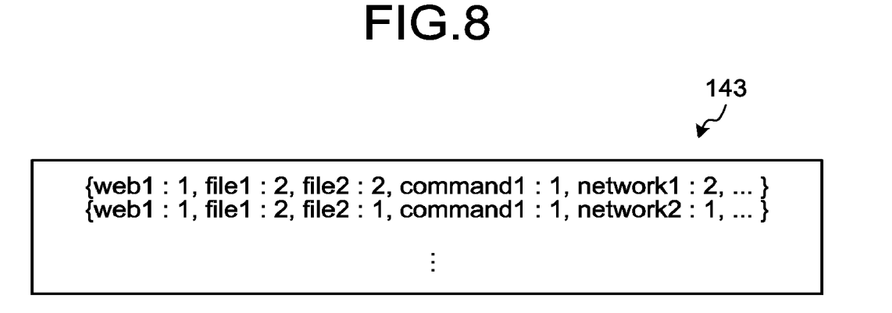
FIG. 8 is a diagram exemplifying a profile list according to the embodiment.

The profiler 154 stores the created profile of the profile list 143 as exemplified in FIG. 8. The event ID assigning process performed by the event ID assigner 153 and the profile creating process performed by the profiler 154 correspond to learning for the attack detection process performed by the attack detector 155, which will be described below.

The attack detector 155 contrasts the event block that is created from the log of events and in which an attack is to be detected with the profile in the profile list 143 to calculate a degree of similarity and, when the degree of similarity is equal to or lower than a given threshold, performs the attack detection process of detecting the event block as an event block containing an event that is abnormal due to an attack.

Figure 9:
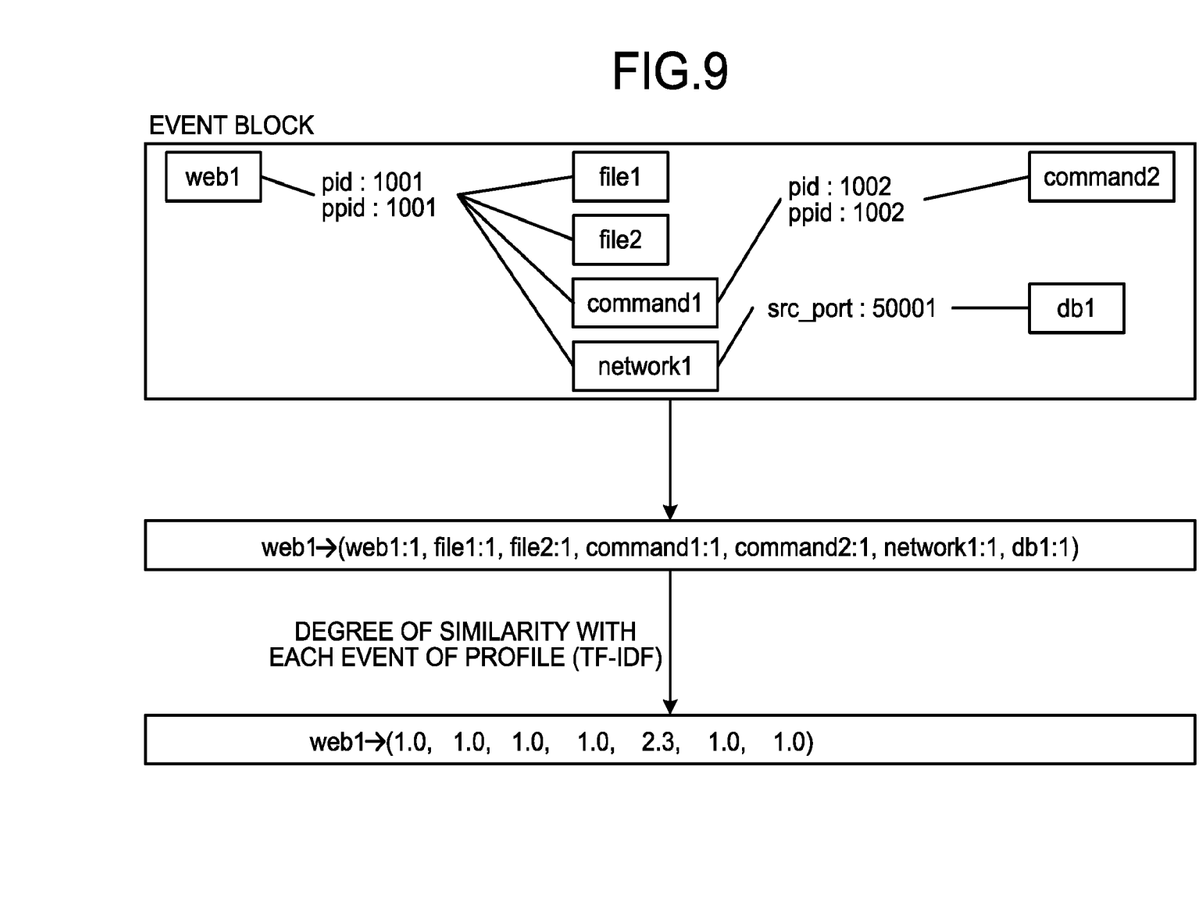
FIG. 9 is an explanatory view illustrating an attack detection process according to the embodiment.

Specifically, as exemplified in FIG. 9, first of all, the attack detector 155 contrasts the event block in which an attack is to be detected with the profile. In other words, the attack detector 155 lists up the HTTP request (web1) serving as the parent process and the events contained in the event block (web1, file1, file2, command1, command2, network1, db1). In the example illustrated in FIG. 9, the number of times each event has occurred is also represented.

The attack detector 155 calculates a degree of similarity between each event contained in the event block in which an attack is to be detected and each event in the profile of the profile list 143. For the degree of similarity, for example, TF-ID that is calculated based on two indices of a term frequency (TF, a frequency at which the word appears) and an inverse document frequency (IDF) is used. In the example in FIG. 9, a degree of non-similarity is calculated instead of similarity and, when the degree of non-similarity represents an abnormal value larger than a given threshold, the attack detector 155 determines that the event is abnormal due to an attack. For example, in the example illustrated in FIG. 9, the degree of non-similarity 2.3 of command2 is an abnormal value larger than a given threshold, the attack detector 155 determines that command2 is abnormal due to an attack.

The attack detector 155 may calculate a degree of similarity between the event block and the profile of the profile list 143 instead of calculating a degree of similarity of each event of the event block in which an attack is to be detected. The attack detector 155 may use the profile list 143 that is created from abnormal events. In that case, when a degree of similarity with the profile of the profile list 143 is higher than a given threshold, the attack detector 155 determines that the event is abnormal due to an attack.

Analysis Process

Figure 10:
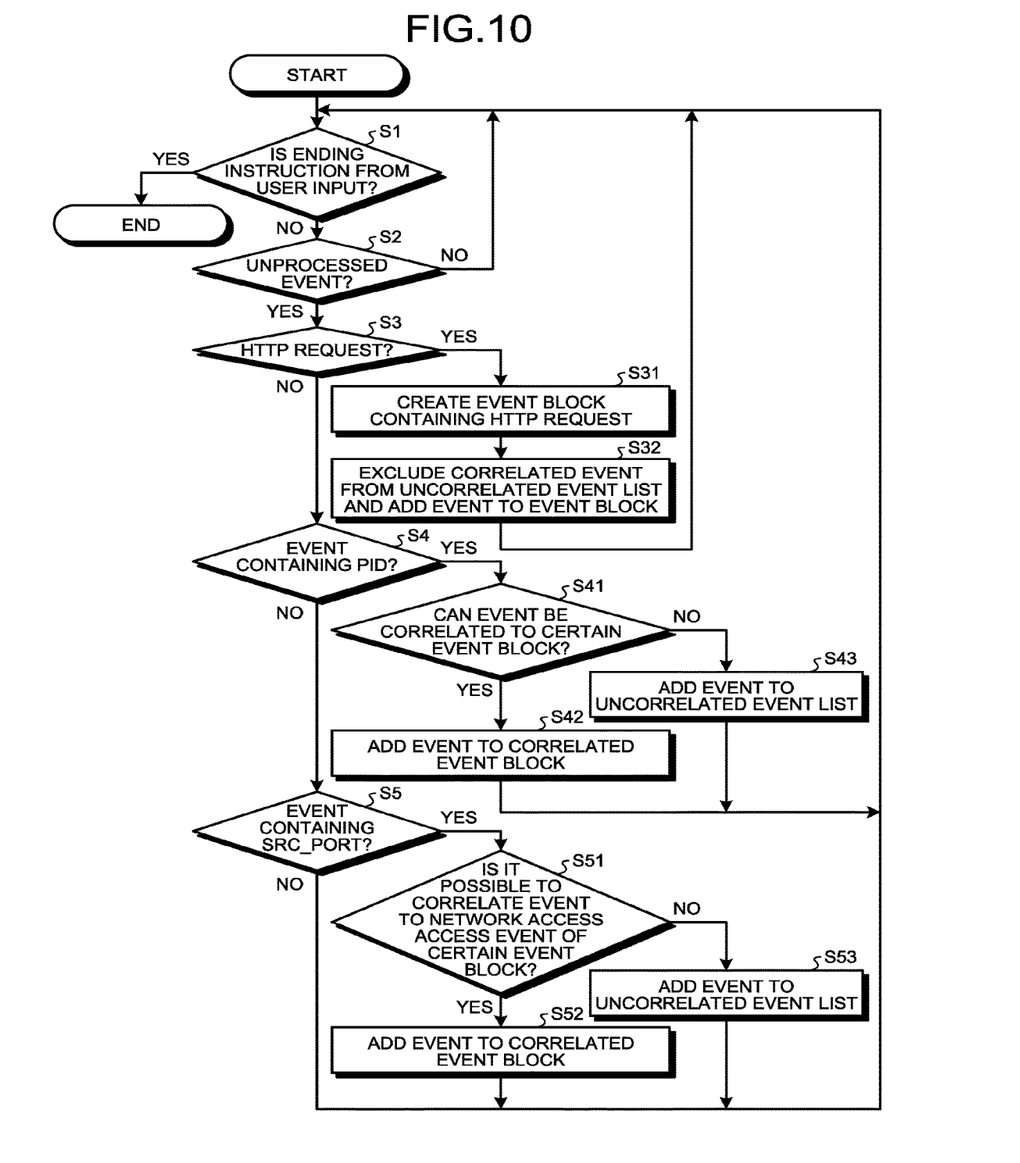
FIG. 10 is a flowchart illustrating a procedure of the analysis process according to the embodiment.

With reference to the flowchart in FIG. 10, a procedure of the analysis process performed by the analysis device 10 will be described. The flowchart in FIG. 10 is started at a timing when a data analyzer inputs an instruction to start an analysis via the input unit 11 and the following process is continued until a command to end the analysis is input (YES at step S1) (NO at step S1).

First of all, the event correlator 152 checks whether there is an unprocessed event (step S2). When there is not any unprocessed event (NO at step S2), the event correlator 152 returns to the process at step S1 and then checks whether there is the next unprocessed event. When there is an unprocessed event (YES at step S2), the event correlator checks whether the event is an HTTP request (step S3).

When the event is a HTTP request (YES at step S3), the event correlator 152 creates an event block containing the HTTP request (step S31). When there is an event that can be correlated to the HTTP request in the uncorrelated event list 141, the event correlator 152 excludes the event from the uncorrelated event list 141, adds the event to this event block (step S32), returns to the process at step S1, and then checks whether there is the next unprocessed event. On the other hand, when the event is not a HTTP request (NO at step S3), the event correlator 152 checks whether the event is an event containing a PID (step S34).

When the event is an event containing the PID (YES at step S4), the event correlator 152 checks whether it is possible to correlate the event to the event block that is created by the process at step S31 (step S41). When it is possible to correlate the event to the event block (YES at step S41), the event correlator 152 adds the event to the event block (step S42), returns to the processing at step S1, and then refers to the next event. On the other hand, when it is not possible to correlate the event to the event block (NO at step S41), the event correlator 152 adds the event to the uncorrelated event list 141 (step S43), returns to the process at step S1, and then refers to the next event. When the event is not an event containing a PID (NO at step S4), the event correlator 152 checks whether the event is an event containing a SRC_PORT (step S5).

When the event is an event containing SRC_PORT (YES at step S5), the event correlator 152 checks whether it is possible to correlate the event to a network access event of the event block that is crated at step S31 (step S51). When it is possible to correlate the event to the network access event (YES at step S51), the event correlator 152 adds the event to the event block (step S52), returns to the process at step S1, and then refers to the next event. When it is not possible to correlate the event to the network access event (NO at step S51), the event correlator 152 adds the event to the uncorrelated event list 141 (step S53), returns to the process at step S1, and then refers to the next event. When the event is not an event containing an SRC_PORT (NO at step S5), the event correlator 152 returns to the process at step S1, and then refers to the next event.

After creating an event block from normal events according to the above-described process, the event correlator 152 creates an event block from a log of events in which an attack is to be detected. The attack detector 155 contrasts the event block that is created from the log of events in which an attack is to be detected with a profile of the profile list 143 that is created from normal events by the event ID assigner 153 and the profiler 154 to calculate a degree of similarity. When the calculated degree of similarity is equal to or lower than a threshold, the attack detector 155 performs the attack detection process of detecting the event block as an event block containing an event that is abnormal due to an attack. Accordingly, a series of analysis processes ends.

As described above, in the analysis device 10 according to the embodiment, the event acquisition unit 151 acquires a log of events containing a HTTP request to the web server 1 and the event correlator 152 creates a set of the HTTP request and events relevant to the HTTP request as an event block by using the process IDs of the processes that process the events. Accordingly, it is possible to accurately correlate different types of events occurring in the same web server 1.

The attack detector 155 compares the event block that is created from the log of events in which an attack is to be detected with the profile of the profile list 143 that is created from normal events to calculate a degree of similarity. When the degree of similarity is equal to or lower than than the given threshold, the attack detector 155 detects the event block as an event block containing an event that is abnormal due to an attack. Accordingly, it is possible to accurately detect an attack to the web application.

Figure 11A:
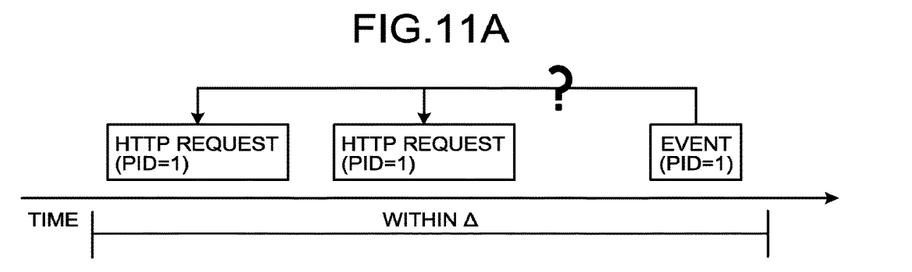
FIG. 11A is an explanatory view for explaining another embodiment.
Figure 11B:
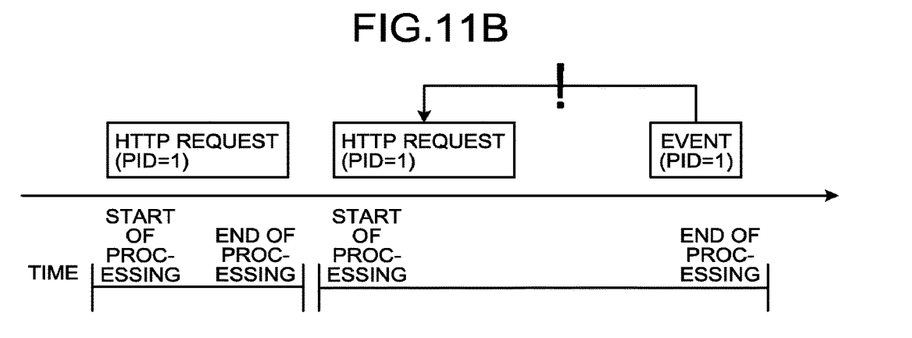
FIG. 11B is an explanatory view for explaining the other embodiment.

In the above-described process performed by the event correlator 152, each of the HTTP requests within the given time Δ is identified by the PID. Note that, as illustrated in FIG. 11A, when HTTP requests occur in a quite short time within the given time Δ, the HTTP requests may be processed by the same PID (=1). In this case, there is a risk that the following event is erroneously correlated to a different HTTP request. For this reason, as illustrated in FIG. 11B, the event acquisition unit 151 acquires the start and end of processing the HTTP request to the web server 1 as events. Accordingly, it suffices if the event correlator 152 correlates, to the HTTP request, events occurring from the start of processing the HTTP request to the end of the processing.

Figure 12:
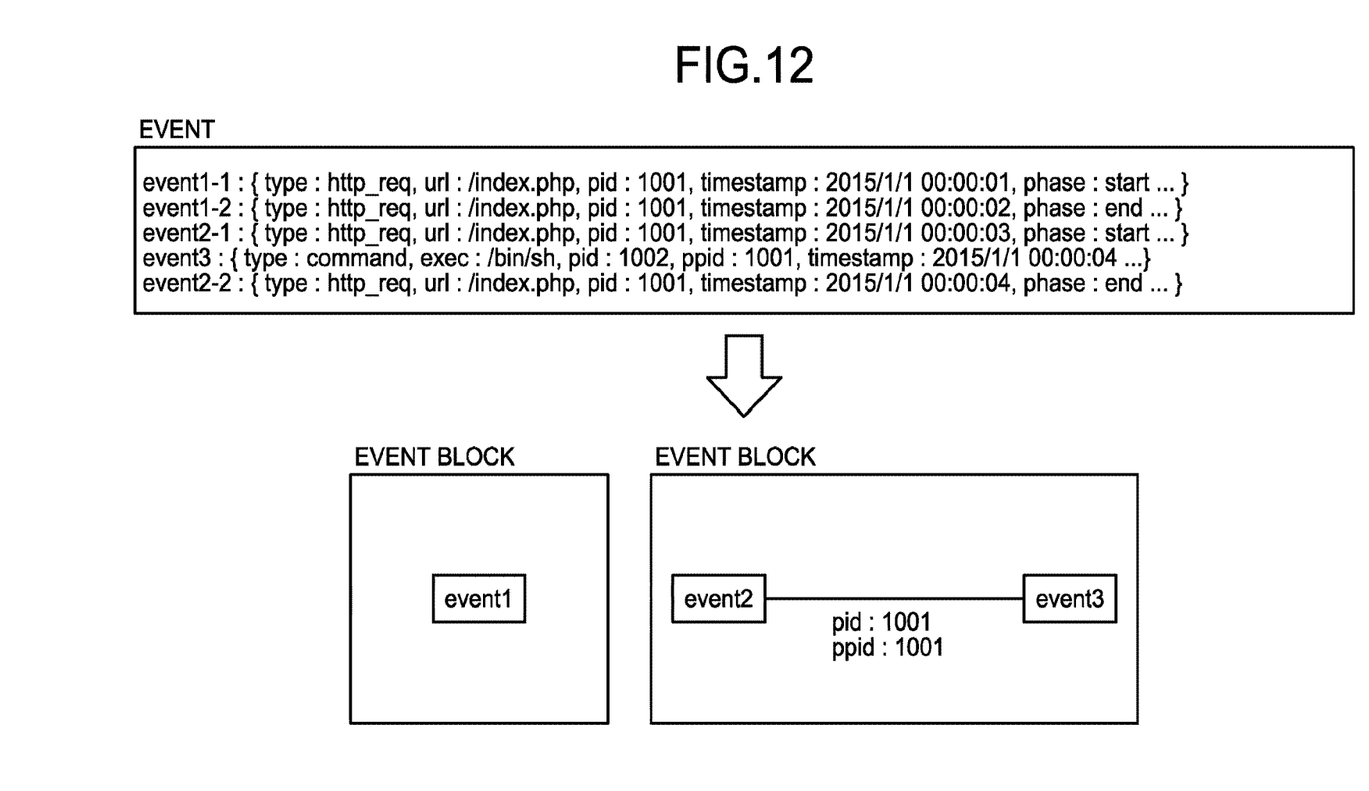
FIG. 12 is an explanatory view for explaining the other embodiment.

Specifically, as exemplified in FIG. 12, the event acquisition unit 151 acquires the start of processing an HTTP request, which is event1, as event1-1 and acquires the end of the processing as event1-2. Furthermore, the event acquisition unit 151 acquires the start of processing an HTTP request, which is event2, as event2-1 and acquires the end of the processing as event2-2, where the event containing start is event x-1 and the event containing end is eventx-2. Accordingly, even when event1 (event1-1 and event1-2) and event2 (event2-1 and event2-2,) have the same PID (pid: 1001), the event correlator 152 is able to accurately correlate event3 to event2. In other words, the event correlator 152 refers to timestamp that is the time at which each event occurs and confirms that the time of occurrence of event3 is between the time of occurrence of event2-1, that is, the start of processing event2 and the time of occurrence of event2-2, that is, the end of processing event2. Accordingly, event3 is correlated not to event1 but to event2 accurately.

Program

A program in which the process executed by the analysis device 10 according to the embodiment is described in a computer-executable language may be created. In this case, a computer executes the program and accordingly the same effects as those of the embodiment can be achieved. Furthermore, the program may be recorded in a computer-readable recording medium and the computer may be caused to read and execute the program stored in the recording medium to realize the same process as those of the above-described embodiment. An exemplary computer that executes the analysis program that implements the same functions as that of the analysis device 10 will be described below.

Figure 13:
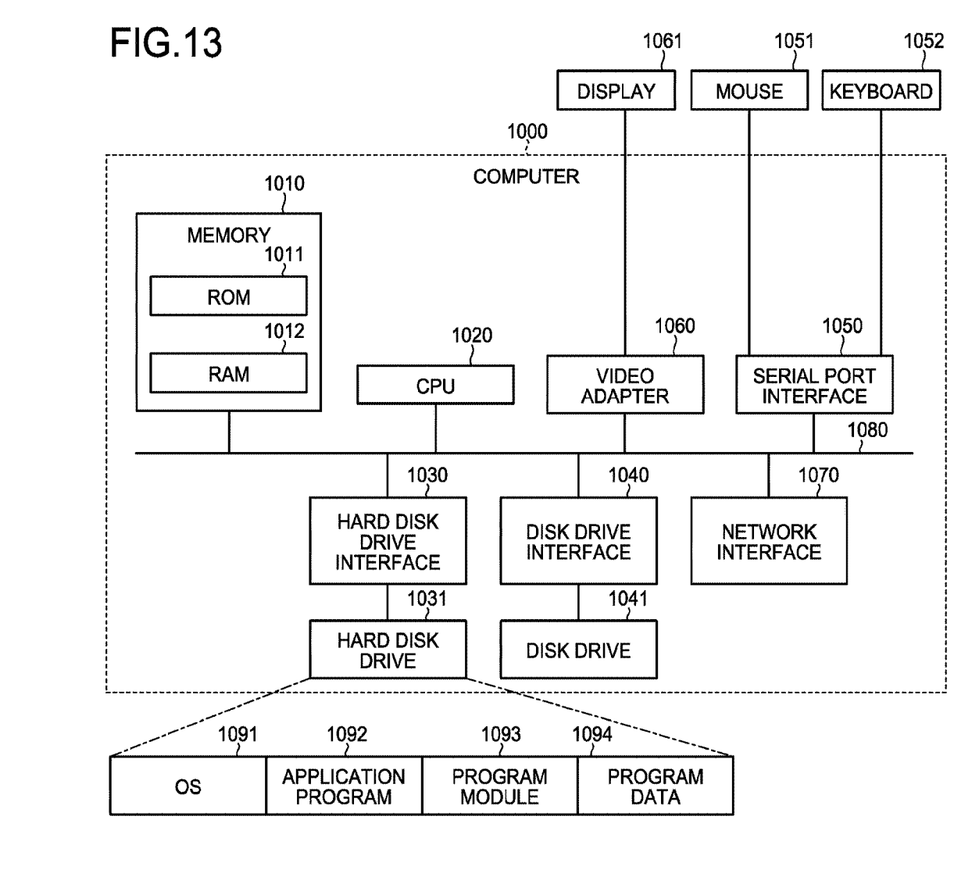
FIG. 13 is a diagram illustrating a computer that executes an analysis program.

As illustrated in FIG. 13, a computer 1000 includes, for example, a memory 1010, a CPU 1020, a hard disk drive interface 1030, a disk drive interface 1040, a serial port interface 1050, a video adapter 1060, and a network interface 1070. The components are connected via a bus 1080.

The memory 1010 includes a read only memory (ROM) 1011 and a RAM 1012. The ROM 1011 stores, for example, a boot program, such as a basic input output system (BIOS). The hard disk drive interface 1030 is connected to a hard disk drive 1031. The disk drive interface 1040 is connected to a disk drive 1041. For example, a removable storage medium, such as a magnetic disk or an optical disk, is inserted into the disk drive 1041. For example, a mouse 1051 and a keyboard 1052 are connected to the serial port interface 1050. For example, a display 1061 is connected to the video adapter 1060.

As illustrated in FIG. 13, the hard disk drive 1031 stores, for example, an OS 1091, an application program 1092, a program module 1093, and program data 1094. Each of the tables described in the above-described embodiment is stored in, for example, the hard disk drive 1031 or the memory 1010.

The analysis program is, for example, stored in the hard disk drive 1031 as the program module 1093 in which, for example, instructions executed by the computer 1000 are described. Specifically, the program module in which each process executed by the analysis device 10 explained in the above-described embodiment is described is stored in the hard disk drive 1031.

The data used for information processing according to the analysis program is stored in, for example, the hard disk drive 1031 as the program data 1094. The CPU 1020 reads the program module 1093 and the program data 1094, which are stored in the hard disk drive 1031, into the RAM 1012 and executes each of the above-described steps as required.

Storing the program module 1093 and the program data 1094 according to the analysis program is not limited to the storing in the hard disk drive 1031. The program module 1093 and the program data 1094 may be stored in, for example, a removable storage medium and may be read by the CPU 1020 via, for example, the disk drive 1041.

Alternatively, the program module 1093 and the program data 1094 according to the analysis program may be stored in another computer that is connected via a network, such as a LAN (Local Area Network) or a WAN (Wide Area Network), and may be read by the CPU 1020 via the network interface 1070.

The embodiments to which the invention made by the inventor is applied have been described above; however, the descriptions and drawings according to the embodiments forming part of the disclosure of the invention do not limit the invention. In other words, other embodiments, examples and technologies to be implemented by those skilled in the art based on the embodiments are all within the scope of the invention.

INDUSTRIAL APPLICABILITY

As described above, it is possible to apply the present invention to detection of an attack to a web application.

REFERENCE SIGNS LIST

1 WEB SERVER
2 NETWORK
3 CLIENT TERMINAL
10 ANALYSIS DEVICE
11 INPUT UNIT
12 OUTPUT UNIT
13 COMMUNICATION CONTROLLER
14 STORAGE UNIT
141 UNCORRELATED EVENT LIST
143 PROFILE LIST
15 CONTROLLER
151 EVENT ACQUISITION UNIT
152 EVENT CORRELATOR
153 EVENT ID ASSIGNER
154 PROFILER
155 ATTACK DETECTOR

The invention claimed is:

1. An analysis method comprising:
an event acquiring step of acquiring a log of events containing a request to a server;
an event block creating step of, by using process IDs of processes having processed events contained in the log, creating a set of the request and events relevant to the request as an event block;
generating a profile of the events in the created event block which indicates an order and number of times of occurrence of each event in the event block; and
an attack detecting step of contrasting the event block that is created from the log of events in which an attack is to be detected with an event block that is created from normal events to calculate a degree of similarity between each individual event in the generated profile of the events and each respective individual event in a predetermined profile that corresponds to the event block that is created from the normal events, and, when the degree of similarity is equal to or lower than a threshold value for at least one of the individual events in the generated profile, detecting the event block as an event block containing an event that is abnormal due to an attack,
wherein
the event acquiring step includes acquiring the start of processing the request and the end of processing the request as events,
the event block creating step includes including an event occurring at a time between a time of occurrence of the event that is the start of processing the request and a time of occurrence of the event that is the end of processing the request in the event block as an event relevant to the request, and
the event block creating step creates a set of the request and events relevant to the request as an event block by including events each occurring at a time having a difference equal to or smaller than a predetermined threshold from the time of occurrence of the request as events relevant to the request.

2. The analysis method according to claim 1, wherein the event block creating step includes creating an event block by using transmission source port numbers contained in the events.

3. The analysis method according to claim 1, wherein the event block is initially created in response to detecting an initial HTTP request.

4. An analysis device comprising:
processing circuitry configured to
acquire a log of events containing a request to a server;
by using process IDs of processes having processed events contained in the log, create a set of the request and events relevant to the request as an event block;
generate a profile of the events in the created event block which indicates an order and number of times of occurrence of each event in the event block; and
contrast the event block that is created from the log of events in which an attack is to be detected with an event block that is created from normal events to calculate a degree of similarity between each individual event in the generated profile of the events and each respective individual event in a predetermined profile that corresponds to the event block that is created from the normal events, and, when the degree of similarity is equal to or lower than a threshold, detect the event block as an event block containing an event that is abnormal due to an attack,
wherein
the processing circuitry is further configured to
acquire the start of processing the request and the end of processing the request as events,
include an event occurring at a time between a time of occurrence of the event that is the start of processing the request and a time of occurrence of the event that is the end of processing the request in the event block as an event relevant to the request, and
create a set of the request and events relevant to the request as an event block by including events each occurring at a time having a difference equal to or smaller than a predetermined threshold from the time of occurrence of the request as events relevant to the request.

5. A non-transitory computer-readable recording medium having stored an analysis program for causing a computer to execute a process comprising:

an event acquiring step of acquiring a log of events containing a request to a server;

an event block creating step of, by using process IDs of processes having processed events contained in the log, creating a set of the request and events relevant to the request as an event block;

generating a profile of the events in the created event block which indicates an order and number of times of occurrence of each event in the event block; and an attack detecting step of contrasting the event block that is created from the log of events in which an attack is to be detected with an event block that is created from normal events to calculate a degree of similarity between each individual event in the generated profile of the events and each respective individual event in a predetermined profile that corresponds to the event block that is created from the normal events, and, when the degree of similarity is equal to or lower than a threshold, detecting the event block as an event block containing an event that is abnormal due to an attack, wherein the event acquiring step includes acquiring the start of processing the request and the end of processing the request as events, the event block creating step includes including an event occurring at a time between a time of occurrence of the event that is the start of processing the request and a time of occurrence of the event that is the end of processing the request in the event block as an event relevant to the request, and the event block creating step creates a set of the request and events relevant to the request as an event block by including events each occurring at a time having a difference equal to or smaller than a predetermined threshold from the time of occurrence of the request as events relevant to the request.

* * * * *